May 5, 1931.  W. C. WHITE  1,803,820
FLEXIBLE PIPE JOINT
Filed Sept. 3, 1925
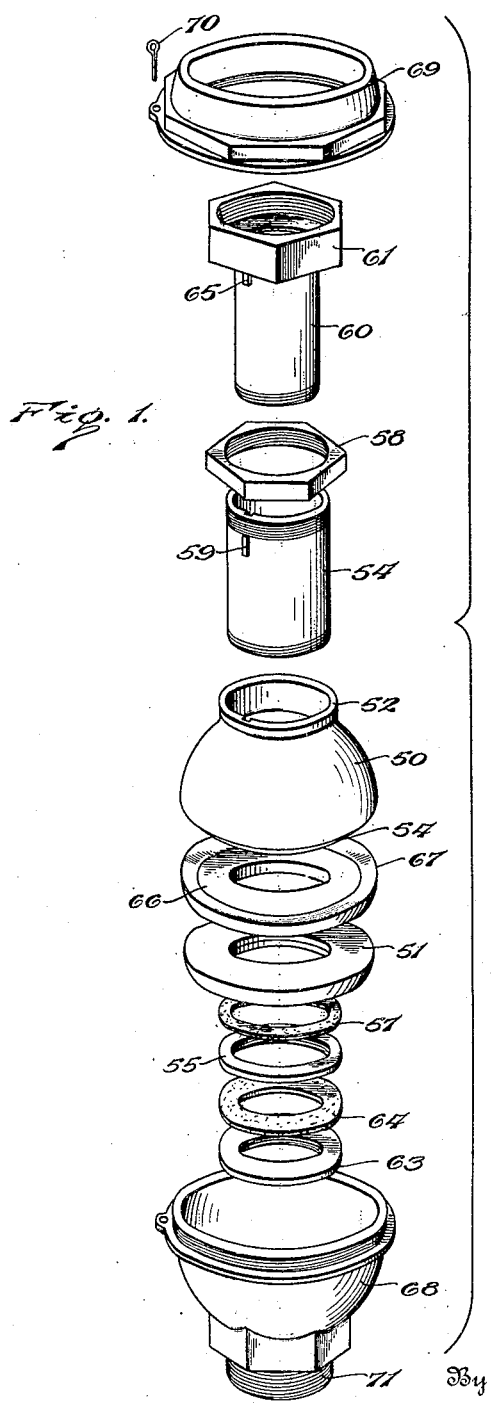
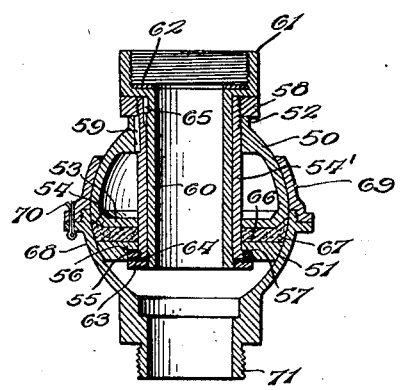
Inventor
W. C. White
By Lacey Lacey Attorneys Patented May 5, 1931

1,803,820

UNITED STATES PATENT OFFICE

WALTER C. WHITE, OF PITTSBURGH, PENNSYLVANIA, ASSIGNOR TO INTERNATIONAL COUPLERS CO., OF PITTSBURGH, PENNSYLVANIA, A COMMON-LAW TRUST

FLEXIBLE PIPE JOINT

Application filed September 3, 1925. Serial No. 54,296.

This invention relates to an improved flexible pipe joint of the general character disclosed in my co-pending application for a similar invention filed July 14, 1925, Serial No. 43,482.

The joint is of the ball and socket type and in the invention disclosed in my co-pending application referred to, adjusting means are provided upon one of the ball sections externally of the joint for compressing and feeding the joint packing to the wall of the socket. In contrast, the present invention seeks to provide a construction wherein the adjusting means mentioned will be mounted independently of said ball section while, at the same time, all of the advantages resident in the former structure will be retained.

Other and incidental objects of the invention will appear as the description proceeds.

In the accompanying drawings:

Figure 1 is a perspective view of the joint, the parts being disassembled but in proper relative position.

Figure 2 is a vertical sectional view taken medially through the joint.

The joint of the present invention is of the ball and socket type. The ball is of sectional construction and includes a body section 50 and a complemental cap section 51. The body section is formed at one end with a nipple 52 and at its opposite end with an end wall 53 having a beveled face 54 at its outer periphery. Slidable through the nipple 52 and through said end wall is a sleeve 54' upon the inner end of which is screwed a retaining nut 55. The ball section 51 is provided at its inner circumference with an annular channel 56 accommodateing the nut, and seated in said channel beneath the nut is an appropriate gasket 57. Screwed on the outer end of said sleeve to coact with the nipple 52 is a feed nut 58, and fixed to the wall of said sleeve is a key 59 locking the sleeve against rotation relative to the body section 50 of the ball, the key being slidable in a suitable slot in the nipple so that the sleeve may shift axially. Slidably fitting through the sleeve 54' is a tubular stem 60 provided at its outer end with a pipe nipple 61 in which is seated a gasket 62, and screwed on the inner end of the stem is a retaining nut 63 overlying the nut 55. Interposed between said nuts is a suitable gasket 64 overlying the inner end of the sleeve 60, and fixed to the wall of the stem near the outer end thereof, is a key 65 slidable in a suitable groove in the adjacent end of the sleeve. Thus, the stem is locked against rotation relative to the sleeve.

Confined between the ball sections 50 and 51 is a packing gasket 66 snugly surrounding the sleeve 54'. This gasket is preferably formed of cork, although other suitable material may be employed, and the gasket is also preferably covered with graphite. At its outer circumference, the gasket is provided at one side thereof with a bead 67 defining a beveled lip to seat flat against the beveled face 54 of the end wall 53 of the section 50, while the opposite side of the gasket is flat to seat the flat inner face of the ball section 51.

Coacting with the ball is a socket including a socket cup 68 upon which is screwed a socket nut 69, and locking the cup and nut together is a key 70. Formed on the cup is a nipple 71 of an internal diameter corresponding to the internal diameter of the stem 60.

As will now be observed, the section 50 of the ball may shift independently on the sleeve 54' and thus provides a follower at one side of the gasket 66, while the section 51 of the ball may also shift independently on said sleeve and thus provides a follower at the opposite side of the gasket. Accordingly, the nut 55 at the inner end of the sleeve may, in assembling the joint, be adjusted to initially compress the gasket for expanding the gasket to properly cooperate with the wall of the socket while, when the gasket becomes worn, the nut 58 at the outer end of the sleeve may be turned in a clockwise direction for advancing the ball sections and compressing the gasket, whereby the gasket will be fed radially to cooperate with the socket wall. I thus provide a means externally of the joint and independent of the stem and ball which means may be adjusted for taking up wear on the gasket and pressing the periphery of the gasket against the socket wall for closing any abrasions in the peripheral surface of the gasket. As brought out in Figure 2, the end wall 53 of the ball section is located in spaced relation at one side of the equatorial plane of the ball and the gasket 66 is accordingly spaced at one side of said plane. The circumference of the gasket is correspondingly reduced with a corresponding reduction in the frictional drag of the gasket against the socket wall while the leverage of the ball on the gasket is correspondingly increased so that the joint may be easily flexed. In any instance where the joint is used in a conduit conducting fluid under pressure, the fluid pressure will, as will be perceived, act against the ball section 51 for pressing said section against the gasket and compressing the gasket so that the gasket will thus be automatically fed to the wall of the socket.

Having thus described the invention, what I claim is:

1. In a flexible pipe joint, coacting joint members, a packing coacting between said members, one of said members including a follower for the packing, means slidably supporting said follower to cooperate with the packing, and a fluid conducting stem fitted within said means and interlocked therewith.

2. In a flexible pipe joint, coacting joint members one providing a socket and the other including opposed followers forming a ball fitting in said socket, a packing interposed between said followers to coact between the ball and socket, means slidably supporting said followers to cooperate with the packing, a fluid conducting stem accommodated within said means, and a nut threaded on the stem for engagement with one of the followers.

3. In a flexible pipe joint, coacting joint members one providing a socket and the other including opposed followers forming a ball fitting in said socket, a packing interposed between said followers to coact between the ball and socket, means slidably supporting said followers to cooperate with the packing, a fluid conducting stem accommodated within said means, means adjustable upon said first mentioned means externally of the joint for compressing the packing, and a nut engaged upon the stem for engaging one of the followers.

4. In a flexible pipe joint, coacting joint members one providing a socket and the other including opposed followers forming a ball fitting in said socket, a packing interposed between said followers to coact between the ball and socket, a sleeve movably supporting said followers, a nut threaded on said sleeve externally of the joint for compressing the packing, a fluid conducting stem fitted within said sleeve, and having one end extending therefrom, and a nut engaged upon the extended end for engagement with one of the followers.

5. In a flexible pipe joint, coacting joint members one providing a socket and the other including opposed followers forming a ball fitting in said socket, a packing interposed between said followers to coact between the ball and socket, a sleeve movably supporting said followers, a nut threaded on said sleeve externally of the joint for compressing the packing, a fluid conducting stem slidably fitting within said sleeve, and a key disposed between said sleeve and said stem and preventing relative rotary movement of the sleeve and stem.

In testimony whereof I affix my signature.

WALTER C. WHITE. [L. S.]